(12) United States Patent
Slagel et al.

(10) Patent No.: US 6,939,939 B2
(45) Date of Patent: Sep. 6, 2005

(54) POLYUREA/URETHANE OPTICAL MATERIAL AND METHOD FOR MAKING IT

(75) Inventors: Edwin C. Slagel, Avondale, AZ (US); Michael J. Slagel, Peoria, AZ (US)

(73) Assignee: Younger Mfg., Torrence, CA (US)

( * ) Notice: Subject to any disclaimer, the term of this patent is extended or adjusted under 35 U.S.C. 154(b) by 160 days.

(21) Appl. No.: 10/373,607

(22) Filed: Feb. 24, 2003

(65) Prior Publication Data

US 2004/0167311 A1 Aug. 26, 2004

(51) Int. Cl.$^7$ ............................................... C08G 18/10
(52) U.S. Cl. ............................ 528/55; 528/58; 528/64
(58) Field of Search ............................. 528/64, 58, 55

(56) References Cited

U.S. PATENT DOCUMENTS

| | | | | |
|---|---|---|---|---|
| 3,997,514 A | 12/1976 | Kogon | ................. | 260/77.5 |
| 5,962,617 A | 10/1999 | Slagel | ................. | 528/61 |
| 5,962,619 A | 10/1999 | Seneker et al. | ................. | 528/64 |
| 6,001,923 A | 12/1999 | Moncur et al. | ................. | 524/590 |
| 6,127,505 A | 10/2000 | Slagel | ................. | 528/61 |
| 6,294,638 B1 | 9/2001 | Manning et al. | ................. | 528/76 |
| 6,391,231 B1 | 5/2002 | Evans et al. | ................. | 264/1.7 |
| 6,531,076 B2 | 3/2003 | Crano et al. | ................. | 252/586 |
| 6,624,276 B2 | 9/2003 | Lamers et al. | ................. | 528/45 |
| 6,650,473 B2 | 11/2003 | Nakagoshi | ................. | 359/490 |
| 6,733,887 B2 | 5/2004 | Okoroafor et al. | ................. | 428/423.3 |
| 2001/0028435 A1 | 10/2001 | Evans et al. | ................. | 351/163 |
| 2001/0050356 A1 | 12/2001 | Crano et al. | ................. | 252/582 |
| 2002/0068809 A1 | 6/2002 | Tamura et al. | ................. | 528/63 |
| 2002/0123601 A1 | 9/2002 | Sonnenschein et al. | ................. | 528/76 |
| 2003/0096935 A1 | 5/2003 | Nagpal et al. | ................. | 528/44 |
| 2003/0195323 A1 | 10/2003 | Tamura et al. | ................. | 528/44 |
| 2004/0087754 A1 | 5/2004 | Foley et al. | ................. | 528/59 |

FOREIGN PATENT DOCUMENTS

| | | |
|---|---|---|
| EP | 0 248 628 A2 | 12/1987 |
| EP | 1 197 505 A1 | 4/2002 |
| WO | WO 96/23827 | 8/1996 |
| WO | WO 01/57106 A1 | 8/2001 |

*Primary Examiner*—Rachel Gorr
(74) *Attorney, Agent, or Firm*—Sheppard Mullin Richter & Hampton LLP

(57) ABSTRACT

A polyurea/urethane material and method for making it provides for improved optical parts. The material allows for ease of manufacture of parts having good optical properties, high hardness, low density, and good impact resistance. The method provides for related manufacturing advantages.

45 Claims, 1 Drawing Sheet

POLYUREA/URETHANE OPTICAL MATERIAL AND METHOD FOR MAKING IT

BACKGROUND OF THE INVENTION

The present invention relates generally to materials for use in ophthalmic lenses and methods for making them and, more specifically, to such materials that provide for high impact resistance, low density, and good optical properties.

Ophthalmic lenses must provide good optical performance, without sacrificing other important properties, such as weight and safety. Therefore, in addition to providing visual acuity, the lenses should not be too heavy for ease and comfort of use, and they should have high resistance to breakage from impact. Generally, the materials used for making such lenses lead to tradeoffs between these desired characteristics. For example, silica glass exhibits excellent optical properties, but it is a heavy (i.e., dense) material. Glass also has poor impact resistance, resulting in the need for thick lenses, which leads to greater heaviness. Standard hard resin plastic lenses are lighter than those made of glass. However, they exhibit even worse impact resistance. An alternate material to these is polycarbonate. Polycarbonate has low density and a high refractive index, resulting in thinner lenses for a given amount of refraction. Polycarbonate also is highly impact resistant, allowing thin lenses to be used safely, without excessive risk of breakage. However, polycarbonate lenses exhibit greater chromatic aberration (i.e., blurring due to different indices of refraction for different wavelengths of light) than lenses made from glass or hard plastic resin, which may be perceived as off-axis or peripheral distortion, or color banding. Because of the limitations of these materials, improved materials have been sought for ophthalmic lenses.

A new class of impact-resistance polyurethanes has been identified that provide improved properties when used in ophthalmic lenses. U.S. Pat. Nos. 5,962,617 and 6,217,505, both to Slagel (respectively the "Slagel '617" and "Slagel '505" patents), herein incorporated by reference, describe initial formulations of these polyurethanes. These polyurethanes can be described as non-elastomeric, engineering plastics characterized by high optical quality and good impact resistance. While an elastomer will elongate at least 200% and return approximately to its original length, an engineering plastic will not undergo significant elongation. Thus, an engineering plastic retains its shape under the stresses of surfacing, grinding and polishing, which provides for superior ease of use and performance when the plastic is used for making ophthalmic lenses.

In the Slagel '617 and '505 patents, these polyurethanes are produced by reacting a polyurethane prepolymer with an aromatic amine curing agent in specific ratios to achieve the desired optical and mechanical properties. Preferred diamine curing agents for making materials for ophthalmic applications include methylenebis(ortho-chloro)aniline, 4,4'-methylenebis(3-chloro-2,6-diethylaniline), and diethyl toluene diamine. These curing agents are reacted with the prepolymer in an equivalent ratio of 0.9 to 1.1 for $NH_2$:NCO concentration.

Though the materials described in the Slagel '617 and '505 patents did show improved impact resistance, they exhibited excessive residual yellowness that was unacceptable for use in standard ophthalmic lenses. The patents disclosed that this yellowness is addressed by addition of small amounts of colorants and also of antioxidant to protect the polyurethane from oxidation. Additionally, these base materials result in lenses that are too flexible to maintain accurate optical power when surfaced using standard optical grinding, polishing, and edging techniques. To address this excessive flexibility, the materials were modified by incorporating additional cross-linking agents to increase the materials' stiffness. For example, a preferred embodiment disclosed in the patents incorporates a small amount of trimethylol propane in the polyurethane prepolymer to improve stiffness. This is a standard technique for modifying polyurethane properties, but obviously it also increases the complexity of the system. Alternate approaches that offer simpler or more controlled routes would be desirable.

While the materials disclosed in the two patents discussed above represent a marked improvement over previously known optical materials, further refinements for ease of manufacturing and optical design implementation, lower cost of manufacture, and additional improvement of impact and other physical properties are desirable. For example, lower viscosity materials would allow for more uniform mixing of the polymer components, resulting in a more reproducible polymerization reaction. Lower viscosities also would enable production of lens and goggle shapes of greater complexity, because the material would flow more evenly and completely over the desired molding surface.

Further enhancement of physical properties also is desirable. However, such enhancement requires balancing of numerous physical, optical and chemical properties. For example, for optimal impact resistance, the material may need to flex to absorb sudden shocks. However, as discussed above, excessive flexibility results in deformation during normal surfacing and grinding procedures, so that the resulting lens may not attain or maintain the desired prescription power, or the correct shape to fit securely in the eyeglass frame. Similarly, improved resistance to environmental extremes is desirable, but not at the cost of optical clarity or unwanted color in the lens.

SUMMARY OF THE INVENTION

The present invention resides in a method for making an optical-quality, impact resistant polyurea/urethane material, comprising the following steps:

1) reacting a first diisocyanate with a first polyol to form a urethane prepolymer having an equivalent ratio of at least about 3 isocyanate groups per hydroxyl group;

2) reacting a second diisocyanate with a second polyol to form a hydroxyl-terminated extended chain polymer having an equivalent ratio of between about 3 and about 8 hydroxyl groups per isocyanate group;

3) blending the hydroxyl-terminated extended chain polymer with a diamine to form a curing agent mixture; and 4) reacting the urethane prepolymer with the curing agent mixture and a catalyst that is configured to promote the reaction of the hydroxyl groups of the curing agent mixture with the isocyanate groups of the urethane prepolymer, to form the polyurea/urethane material.

In preferred aspects of the method, the urethane prepolymer has an equivalent ratio of between about 4 and about 16 isocyanate groups per hydroxyl group, and more preferably between about 8 and about 12 isocyanate groups per hydroxyl group. Preferably, the hydroxyl-terminated extended chain polymer has an equivalent ratio of between about 3 and about 5 hydroxyl groups per isocyanate group. The first diisocyanate preferably incorporates an aliphatic or cycloaliphatic diisocyanate, most preferably 4,4'-methylenebis(cyclohexyl isocyanate), 1,3-, 1,4-bis (isocyanatomethyl) cyclohexane, isophorone diisocyanate, tetramethylxylene diisocyanate, or mixtures of these. The first polyol preferably incorporates a diol having a molecular weight between about 150 and about 4,000, and it preferably incorporates polyester diol, polyether diol, caprolactone diol, polycarbonate diol, or mixtures of these. Preferred aspects of the method incorporate a step of blending additives into the urethane prepolymer.

The second diisocyanate preferably incorporates an aliphatic or cycloaliphatic diisocyanate, such as 4,4'-methylenebis(cyclohexyl isocyanate), 1,3-, 1,4-bis(isocyanatomethyl) cyclohexane, or mixtures of these. The second polyol preferably incorporates a diol having a molecular weight between about 90 and about 4,000, preferably one or more caprolactone diols. The diamine preferably comprises aromatic diamine, preferably diethyltoluenediamine, 4,4'-methylenebis(3-chloro-2,6-diethylaniline), (4,4-methylene-bis-2-chloro-aniline), 1,2-bis(2-aminophenylthio) ethane, or mixtures of these.

The catalyst preferably is present in an amount between about 10 ppm and about 650 ppm of the combined amount of the urethane prepolymer and the curing agent mixture. The catalyst preferably comprises metal, such as tin, cobalt, or mercury. Preferred catalysts include dibutyl tin dilaurate, dibutyl tin diacetate, dibutyl tin oxide, dimethyl tin carboxylate, or mixtures of these. In preferred aspects of the method, the steps of reacting and blending the species all are performed while minimizing contact of the species with oxygen or water.

Preferably, the step of reacting the urethane prepolymer with the curing agent mixture incorporates reacting the urethane prepolymer with the curing agent mixture in a ratio ranging between about 0.85 to about 1.1 amine units per isocyanate unit, and more preferably between about 0.90 to about 1.0 amines units per isocyanate unit.

The method of the present invention also resides in a method similar to that described above, in which the hydroxyl-terminated extended chain polymer, diamine and catalyst are blended to form the curing agent mixture. The present invention further resides in optical-quality, highly impact resistant non-elastomeric polyurea/urethane comprising the reaction product of the urethane prepolymer, curing agent mixture, and catalyst discussed above, as well as optical-quality, impact resistant parts made from this material. The present invention also resides in optical-quality, impact resistant parts produced using the methods discussed above.

DETAILED DESCRIPTION OF THE PREFERRED EMBODIMENTS

Figure 1:
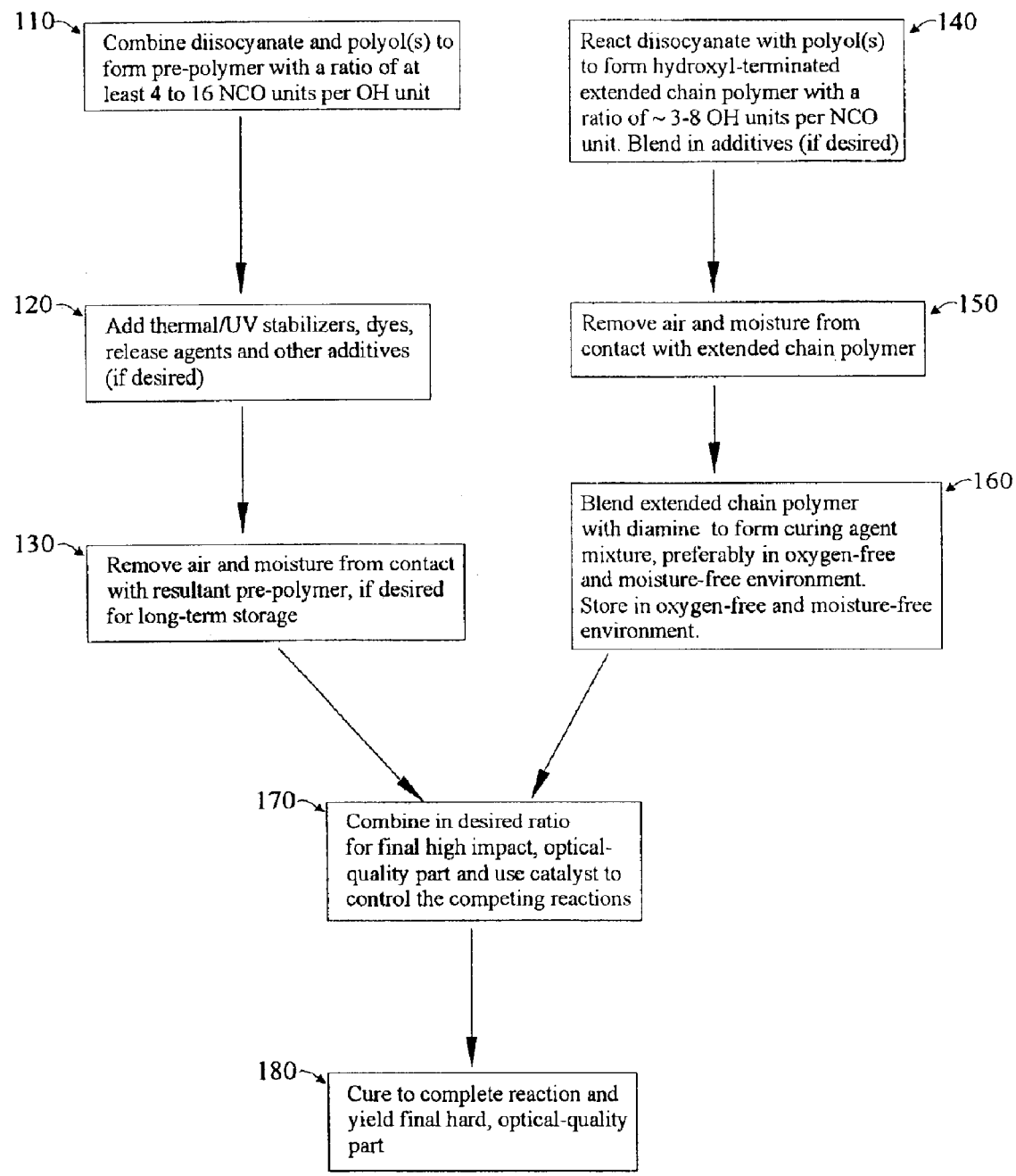
FIG. 1 is a graphical representation of a preferred method for making the optical material and an example of its use within the scope of the present invention.

The present invention resides in a polyurea/urethane material for use in optical-quality parts and methods for making the material. The material is a non-elastomeric engineering plastic that provides for high impact resistance, low density, and good optical qualities. These materials are useful in a wide range of optical products, including ophthalmic lenses and lens blanks, visors, goggles, and shaped masks.

A standard procedure for forming polyurethanes is to combine a two-part system, herein described as Components A and B. Component A contains the diisocyanate, and Component B contains the curing agents, which typically incorporated either hydroxyl or amine units. These two Components then are mixed and reacted to form the final product polyurethane. Further refinements to create highly impact-resistant polyurethanes having improved optical properties are outlined in the Slagel '617 and '505 patents discussed above. These refinements relate to the chemistries of Components A and B, as well as to careful control of the reactant mixture ratio. Specifically, the diisocyanate in Component A is pre-reacted with appropriate hydroxyl groups to create reactive prepolymer chains. Also, diamines are used as the curing agent for Component B for increased toughness of the final product polyurethane. However, as pointed out in the Slagel '617 and '505 patents, the diamine concentration must be kept low to avoid unacceptable haze and to maintain acceptable impact resistance in the final polyurethane. This process is successful, but it requires an extremely careful control of the ratio between Components A and B to maintain optical clarity while ensuring good physical properties. In addition, both Components A and B can be quite viscous—particularly Component A, which typically has a viscosity in the range of 2,000–30,000 centipoise at room temperature. Furthermore, when Components A and B are combined, they begin to react and harden within several seconds, which makes uniform filling of complex molds extremely difficult. Hence, reaction of these Components can have drawbacks for quick and accurate production processes.

In view of the above, it has been surprisingly found that a polyurea/urethane polymer having high hardness and good optical clarity can be produced by a new method providing considerably greater freedom in processing conditions and employing marked changes to both Components A and B that would not have been expected to successfully result in the desired optical product. Specifically, the method of the present invention incorporates an unusually high ratio of reactive isocyanate to hydroxyl groups in Component A to yield a low viscosity prepolymer. This results in a Component A that is easier to dispense. However, the isocyanate content of this low viscosity Component A prepolymer is not in the correct ratio for subsequent reaction with typical Component B diamine formulations. Therefore, the method of the present invention also incorporates a Component B that contains a mixture of reactive compounds, some with hydroxyl units, and some with diamine groups. Advantageously, this new Component B mixture also has low viscosity to ease processing. This approach is extremely unusual, because the diamine reaction rates so predominate that one would not expect hydroxyl reactions to be able to compete sufficiently to avoid the haze formation often associated with diamine reactions. To avoid this problem, another unique and essential feature of the method of the present invention is use of a catalyst to control the competing reaction pathways between the different reactive compounds of Component B and the prepolymer of Component A when these Components are combined to form the final product. This catalyst serves to accelerate the reaction of the hydroxyl groups of Component B with the isocyanate groups of Component A. Therefore, the desired additional hydroxyl reactions have been accelerated without loss of the balance of optical and physical properties. This new method provides the ability to achieve adequate optical and impact performance with a broader ratio range of amine:hydroxyl:isocyanate species than previously possible. In addition, this reactive ratio is more easily and reproducibly controlled, because the relative ratio of these species can be adjusted in multiple steps, rather than in a single-shot process.

Therefore, the properties of the final product also are more easily adjusted than using previously-known processes.

As mentioned above, the use of a catalyst is key to tailoring the reaction to create the final product. This is necessary, because if the higher reactivity of the amine groups is not controlled during reaction, the material produced will lose optical clarity and become brittle. Nonetheless, the amine reaction is essential for producing materials having sufficient hardness and toughness to maintain shape, even when subjected to further surfacing and grinding to form, for example, prescription lenses. Ophthalmic lenses made from the polyurea/urethane produced by the method of the present invention exhibit a combination of good optical clarity, impact resistance, chemical resistance, and hardness. Moreover, these properties are achieved without necessitating the use of additional crosslinking agents, which are often included in conventional polyurethanes to increase hardness. Use of the new method of the present invention may be identified in the final product by the trace incorporation of the essential catalyst.

In addition to the advantages discussed above, the method of the present invention creates intermediate components and component mixtures having low viscosity. These low-viscosity intermediates are easier to combine than thicker, more viscous materials, and the intermediates can be mixed without causing gas entrapment that would degrade the optical properties of the resulting material. The low-viscosity intermediates also are amenable to simple pre-filtering to remove trace impurities or entrapped particles, resulting in final products having improved optical clarity and cosmetics. The multiple steps of the method also create mixtures that are less sensitive to the precise ratio of amine to isocyanate species, and likewise less sensitive to the precise ratio of isocyanate to hydroxyl species than mixtures previously known, allowing for manufacturing flexibility without sacrificing material properties.

The material of the present invention is an optical-quality, non-elastomeric, high impact resistant polyurea/urethane polymer that is the reaction product of the following multi-step method:

1) prepare a urethane prepolymer by reaction of aliphatic or cycloaliphatic diisocyanate with polyol;

2) prepare an additional pre-reaction of a diisocyanate with polyol to create extended polymer chains having central urethane group(s) and hydroxyl groups terminating the chains;

3) prepare a mixture containing the hydroxyl-terminated species of step 2) and aromatic diamines; and 4) react the prepolymer of step 1) and the mixture of step 3) in the presence of a catalyst as described above.

The reaction product of the above components may be prepared using the following procedure, as illustrated in FIG. 1. Using standard urethane nomenclature, Component A is the prepolymer prepared in step 1), but Component B now becomes a mixture of the precursors described in steps 2) and 3). Components A and B are then reacted in the presence of a catalyst in step 4) to form the polyurea/urethane material, which is cured to complete the reaction and create the desired optical part. Various thermal and ultraviolet stabilizers, dyes, release agents and other known additives may be added during the multi-step process of forming the polyurea/urethane. Preferably these materials initially are added to Component A, to avoid contamination of Component B reactants from oxygen or water during the addition. Such contamination, though a potential problem for both Component A and Component B, is more critical to Component B. If desired, the reaction at step 4) can occur in, or be directed into, a mold assembly to produce a shaped optical part.

The multi-step approach discussed above allows for production of the optical-quality polyurea/urethane of the present invention using low-viscosity precursors for ease of processing. Specifically, Component A, as well as the mixture that in this method constitutes Component B, both possess low viscosity and are easily mixed and filtered. The lower viscosity of these precursors can be particularly advantageous when other materials, such as various additives, are to be mixed homogeneously into the bulk of the polyurea/urethane. Similarly, if films, laminates, or other solid inserts will be included in or on the optical part, low viscosity precursors may be desirable for even coverage and reproducible positioning of the insert. Furthermore, the combination and catalytic tailoring of the reaction products with both diamines and hydroxyl species provides controlled methods to optimize the optical and material properties of the resulting polymer. For example, pure hydroxyl reactions with diisocyanate may produce a high hardness polymer (i.e., having a Shore D hardness of 80 and greater), but generally these polymers are too brittle for optical applications requiring high impact resistance. Pure amine or diamine reactions with diisocyanate generally yield opaque materials having unacceptable light transmission properties for use in optical applications. In the method described above, hydroxyl and amine reactions are balanced to ensure that the resulting product is sufficiently hard, resilient, non-elastomeric, and of acceptable optical quality.

The various features, details and aspects of the method of the present invention can be better understood by reference to FIG. 1 and the description of a preferred aspect of the method of the present invention below. FIG. 1 is a flowchart illustrating the general process of forming an optical-quality part according to a preferred embodiment of the method.

In step 110, diisocyanate is combined with polyol to prepare the urethane prepolymer (Component A discussed above). To provide for good optical performance, aliphatic or cycloaliphatic diisocyanates are preferred. Particularly preferred diisocyanates include 4,4'-methylenebis (cyclohexyl isocyanate), 1,3-,1,4-bis(isocyanatomethyl) cyclohexane, 1,3-cyclohexane diisocyanate, 1,4-cyclohexane diisocyanate, isophorone diisocyanate ("IPDI"), tetramethylxylene diisocyanates, as well as mixtures of these compounds or their isomers. One particularly preferred mixture of diisocyanates for use in making the material of the present invention is a mixture of trans, trans-, cis, trans-, and cis,cis-4,4'-methylenebis(cyclohexyl isocyanate) isomers. A commercially available mixture of these isomers with approximately 20% trans, trans-, and 80% cis,trans- and cis,cis-species is marketed by Bayer Corporation under the registered trademark Desmodur® W.

Preferred polyols for reaction with the diisocyanate in step 110 are diols having molecular weights in the range from about 150 to about 4,000, including polyester diols, polyether diols, caprolactone diols, and polycarbonate diols. Preferred polyols include those polyester diols derived from esterification products of ethylene glycol, neopentyl glycol, 1,4-butanediol and 1,6-hexanediol, and caprolactone diols derived from the reaction of E-caprolactone with ethylene glycol, neopentyl glycol, 1,4-butanediol and 1,6-hexanediol.

Specific polyols having narrow molecular weight distributions, or mixtures of polyols having different molecular weights may be used to create a desired average molecular weight distribution. As the average molecular weight of the polyol increases, the chain length of the prepolymer produced in step 110 also will increase. The preferred range for the average molecular weight of the polyols used in step 110 is between about 400 and about 1,200. When a mixture of high and low molecular weight polyols is used to attain a specific average molecular weight distribution, polyols having molecular weights from about 150 to about 4,000 can be combined. A particularly preferred exemplary mixture of polyols used in step 110 is 48.9% caprolactone diol having a molecular weight of about 400, 16.1% caprolactone diol having a molecular weight of about 3,000, and 35.0% caprolactone diol having a molecular weight of about 4,000.

As indicated by this exemplary mixture, preferred polyol mixtures may be produced from caprolactone polyols, such as commercially available caprolactone diols. Mixtures of polyether diols with polyester diols generally are less preferred, because they may be immiscible, leading to haze in the final product.

As stated above, the diisocyanates and polyols are reacted in step 110 to form a urethane prepolymer. The polyols optionally can be heated to further reduce the viscosity of the polyols and allow for easier blending with the diisocyanates. For example, it is preferred to heat the polyol mixture described above to a liquid state at a temperature between about 50° C. and about 85° C. for easier handling.

The ratio of isocyanate to hydroxyl groups in this reaction preferably is at least 3 isocyanate groups per hydroxyl group, more preferably in the range of at least 4 to 16 isocyanate groups per hydroxyl group, and most preferably in the range of 8 to 12 isocyanate groups per hydroxyl group. This provides for an unusually high ratio of isocyanate to hydroxyl groups in the prepolymer, in comparison to methods previously know to produce high hardness, high impact resistance polymers having excellent optical quality. For example, in the Slagel '505 patent, the stated ratio of isocyanate to hydroxyl to form the specified prepolymer is in the range of 2.5 to 4.0 isocyanate groups per hydroxyl group. The higher isocyanate to polyol ratio of the present invention results in a urethane prepolymer having significantly lower viscosity than those produced using previously known methods. This allows for easier and more complete mixing of materials in the subsequent steps of the method.

As stated above, prior to mixing the polyols with the diisocyanates, the polyols optionally can be heated to a liquid state to provide for easier blending, especially if they are solid or have high viscosity at room temperature. In a preferred method for preparing the urethane prepolymer, the diisocyanate is added into a reaction vessel equipped with a heat source, means for thoroughly mixing the reactants and monitoring their temperature, and an inert gas source for preventing exposure of the reactants to air and moisture. The polyol components then are added to the reactor and actively mixed with the diisocyanate.

Mild heat then is applied to begin the reaction. The amount of heat applied will be dependent on the diisocyanate used and the desired speed of initiating and controlling the reaction. Typically, a broad range of temperature/time conditions is suitable for use with the method of the present invention, which allows for greater production freedom. For example, for the preferred commercially available diisocyanate and the polyol mixture mentioned above, a temperature of approximately 70° C. can initiate the reaction, but the reaction then will progress slowly. Using the same mixture, temperatures higher than about 160° C. may lead to yellowing, increased viscosity of the prepolymer due to increased side reactions, and excessive reaction of the isocyanate groups, such that they are fully bound chemically and not available for further reaction to form the desired end product polyurea/urethane. Therefore, exemplary conditions for the exemplary reactants mentioned above involve heating the reactants to a temperature of about 140° C. and allowing the reaction to proceed over approximately one hour.

When a temperature within the desired range is reached, the heat source may be removed, and the reaction then may continue on its own. Depending upon the diisocyanate used, an exothermic reaction may occur and therefore, removing external heat reduces the chance of any exotherm leading to decomposition, and thus ensures better control of the reaction. Alternately, if the diisocyanate used does not react exothermically, heat may be applied for a longer period of time without detriment. In either case, once heat is removed the mixture eventually will cool as the reaction progresses to form the urethane prepolymer.

As illustrated in FIG. 1 at step 120, various additives may be incorporated into the mixture. As discussed above, typical additives include antioxidants, ultraviolet stabilizers or absorbers, optical dyes, colorants, thermal stabilizers, mold release agents, optical brighteners, surfactants, plasticizers, inert impact modifiers and other similar compounds. Several examples of these compounds are discussed in the Slagel '505 patent. One exemplary mixture of suitable additives incorporates: 1% Irganox 1010 (a hindered phenol-type antioxidant, available from Ciba Specialty Chemicals, Inc.); 1% Tinuvin® 328 (a benzotriazole UV-stabilizer, available from Ciba Specialty Chemicals, Inc); 1% Lowilite 92 (a hindered amine light stabilizer, available from Great Lakes Chemical Corp.); 4 to 20 ppm Exalite Blue 78-13 (an optical dye, available from Exciton, Inc.); and 4 ppm SF-8843 (a silicone-based surfactant, available from GE Silicones).

Additives preferably are combined into the prepolymer mixture when the reaction mixture has cooled to a temperature such that the additives will not lose their efficacy due to thermal degradation, and yet will be soluble in the reactant mixture. For example, for the preferred prepolymer mixture mentioned above, the exemplary additive mixture discussed above may be added when the prepolymer has cooled to a temperature in the range of about 100° C. to 120° C. without damaging the optical or mechanical performance of either these additives or the final properties of the polyurea/urethane product. Depending upon the particular optical application for which the material is to be used, as well as environmental requirements and product color desired, other mixtures of these or alternate additives can be used, and the temperatures of addition adjusted accordingly.

Next, as illustrated in FIG. 1 at step 130, air and residual moisture are removed from contact with the urethane prepolymer by evacuating the reactor or additional purging of the reactor with inert gas. Evacuation is preferred to ensure that no extraneous air or water is present. The procedure of step 130 eliminates the likelihood of unwanted reaction of any remaining diisocyanate, or of pendant isocyanate groups on the prepolymer, with residual moisture. Such reactions could form entrapped pockets of carbon dioxide gas bubbles or create gel particles. In general, unwanted, uncontrolled reaction with moisture will degrade the optical properties of the prepolymer and also could produce excess pressure in the container.

If the urethane prepolymer is to be stored before use, it is preferable to maintain it either under vacuum or in an inert gas atmosphere, such as nitrogen or argon, to prevent contamination by air or moisture during storage. This increases the shelf life of the urethane prepolymer, so the material can be made well ahead of time for advanced planning of manufacturing cycles. Using these storage methods, the prepolymer can be stored at room temperature for several months without exhibiting any substantial degradation.

Separately, as shown in FIG. 1, in step 140 diisocyanate(s) are combined with polyol(s) to form hydroxyl-terminated extended polymer chains. The same diisocyanate used in step 110 may be employed to form these chains, or another aliphatic or cycloaliphatic diisocyanate, or mixtures thereof, can be chosen. Two preferred diisocyanates that provide superior overall properties for these extended chains are: 4,4'-methylenebis(cyclohexyl isocyanate), such as the isomeric mixture available from Bayer Corp. as Desmodur W; and, cycloaliphatic diisocyanates, such as 1,3-,1,4-bis(isocyanatomethyl) cyclohexane, available from Dow Chemical Co.

Similarly, the same polyols or mixtures of polyols discussed above for step 110 can be used in step 140, or an alternative mixture may be used. The range of polyol molecular weights that can be used in step 140 is about 90 to about 4,000, but the average molecular weight distribution preferably should be in the range of about 300 to about 1,200. Caprolactone diols are preferred, due to their low polydispersity and low intrinsic color. While some polyols can be markedly yellow or orange in color, typical APHA color values for the caprolactone compounds are less than 10. APHA values less than 20 are not visually detectable, and therefore should not add appreciable color to the final product. This allows for better manufacturing control of the color of the final material. Generally, a mixture of polyester and polyether diols is not preferred in step 140, especially in the molecular weight range of the present invention, because these compounds may not be mutually compatible and therefore may lead to increased haze in the material. An exemplary preferred mixture of caprolactone diols for step 140 contains 12.2% diols having a molecular weight of about 400, 35.9% diols having a molecular weight of about 750, 48.2% diols having a molecular weight of about 1,000, and 3.7% diols having a molecular weight of about 4,000.

In step 140, diisocyanate(s) are reacted with polyol(s) in a significantly different ratio from that used in step 110. To create the hydroxyl-terminated extended chain polymer of step 140, the hydroxyl groups predominate in a ratio range of 3 to 8 hydroxyl groups per isocyanate group, and preferably a ratio of 3 to 5 hydroxyl groups per isocyanate group. At lower ratios, the viscosity of the mixture increases substantially, leading to manufacturing difficulties.

The mixture of diisocyanate and polyol species then is heated to a temperature sufficient to start and maintain the reaction between the selected diisocyanate and polyol mixtures. For example, for the preferred commercially available diisocyanates mentioned above and the exemplary mixture of caprolactone diols, the mixture may be heated to about 140° C. to complete the reaction between the isocyanate and hydroxyl groups within about an hour. Lower temperatures can be used, and would necessitate longer reaction times. In this example, when the reaction temperature reaches 140° C., the heat source is removed, and the exothermic reaction allowed to proceed on its own.

Before proceeding with further steps of the method of the present invention, the reactive mixture preferably is allowed to cool to avoid thermal degradation, yellowing, entrapped moisture, or undesired side reactions with subsequently added materials. The degree of cooling will depend on the temperature sensitivity of the materials to be added. With the particular reactants discussed above, the reactant vessel preferably is cooled to a temperature below about 85° C.

If desired, additives to tailor the optical and physical properties of the final material may be mixed into the extended chain polymer produced in step 140, similar to the options discussed for step 120. This can provide additional manufacturing freedom by apportioning the additives between the two mixtures.

As illustrated in FIG. 1 at step 150, after the reaction mixture has cooled and any optional additives have been blended into the polymer, it is advisable to either purge or evacuate the air from the vessel to decrease the chance of side-reactions and degradation with moisture. If longer storage is desired, the hydroxyl-terminated extended chain polymer may be transferred into a storage container, which preferably is evacuated or purged of air and moisture (such as by replacement with argon or nitrogen gas), and sealed.

Proceeding with the method as illustrated in FIG. 1, in step 160 the extended chain hydroxyl-terminated polymer is combined with additional, separate curing agents, namely diamines. As mentioned above, in polyurea/polyurethane chemistries, the reactants often are defined as two-component systems: the first component (Component A) contains the isocyanate, and the second component (Component B) contains the curing agent, commonly either amines or hydroxyl groups. In the present invention, however, while the first component is characterized by the urethane prepolymer formed from step 110, the Component B curing agent (as formed in step 160) is actually a mixture of reactants, some of which contain amine groups, and some of which contain hydroxyl groups. Specifically, this Component B reactive mixture contains: 1) the hydroxyl-terminated extended chain, formed by the reaction of the diisocyanate with the polyol in step 140; and 2) the diamines added at step 160.

The diamines mixed with the hydroxyl-terminated extended chain polymer in step 160 preferably are aromatic diamines, similar to those disclosed in the Slagel '505 patent. Though hydrazine also may be used, its fast reactivity may be more difficult to control than that of aromatic diamines. Preferred compounds include diethyltoluenediamines and 4,4'-methylenebis(3-chloro-2,6-diethylaniline), 4,4-methylenebis(2-chloroaniline), methylene dianiline, methylene bis(methyl anthranilate), 1,2-bis(2-aminophenylthio)ethane, and trimethylene glycol di-p-aminobenzoate, which may be used singly or in combination. When mixing the hydroxyl-terminated extended chain polymer with the diamine(s), the reactant mixture preferably is maintained under vacuum or an inert atmosphere, such as nitrogen or argon. Preferred relative ratios of aromatic diamines that are added in step 160 to the hydroxyl-terminated extended chain polymer (prepared in step 140) are from about 30% $NH_2$: 70% OH to about 70% $NH_2$: 30% OH, and more preferably about 50% NH2 to 50% OH. Excess hydroxyl units in this mixture result in losses in hardness, heat stability, and impact properties for the final product. Excess amine units result in haze and loss of impact properties due to brittleness in the resultant product.

Preferably, the preparation of the curing agent mixture in step 160 occurs in the absence of oxygen, to prevent oxidation and yellowing of the reactants, particularly the diamines. In addition, if moisture is entrapped with these reactants, it can participate in competing and undesirable reactions during further processing, as is described below.

To avoid exposure to oxygen, a preferred aspect of the method involves mixing the hydroxyl-terminated extended chain polymer with the diamines while actively purging the container with nitrogen. The container may then be evacuated to remove residual air and moisture, prior to storage of the blended reactant mixture of Component B. This Component B mixture may be stored under vacuum, or in an inert gas or nitrogen gas atmosphere at room temperature, for at least several weeks without significant degradation or yellowing.

Using the method of the present invention, no cross-linking agents are required to prepare a material possessing high impact resistance without brittleness. For example, in the Slagel '505 patent, triols are recommended to enhance the physical properties of the optically transparent product. While cross-linking agents optionally may be added in the method of the present invention, either to the urethane prepolymer at step 120 or the curing agent mixture of step 160, the use of such agents is not required to achieve good mechanical performance. This optional incorporation provides more freedom in manufacturing design, simplifying material preparation and potentially reducing costs. Additionally, it avoids the practical problems associated with incorporating small amounts of cross-linking agents: that is, if too little is added, it may not be effective, or may not be uniformly distributed in the reaction mixture, but if too much is added, excessive cross-linking can rapidly increase the material's viscosity, and actually lead to increased brittleness in the final product.

As illustrated in FIG. 1 at step 170, the urethane prepolymer product from step 130 (i.e., the Component A prepolymer) then is combined with the mixture of reactants from step 160 (i.e., the Component B curing agent mixture) in the desired ratio, and their reaction is catalytically controlled to obtain the final optical-quality product.

Preferably, combination of Components A and B should proceed with limited exposure to air or moisture. As mentioned in step 160, if moisture enters either the reactant mixture of step 160 or at this stage, competing reactions involving water will be catalyzed to the detriment of the desired hydroxyl:isocyanate reaction of the method of the present invention. Reaction with water or moisture leads to the formation of foam, causing entrapment of gas bubbles, which could adversely affect the cosmetic or functional quality of the optical parts. Air exposure and gas entrapment at step 170 may be minimized in small batch samples by evacuating the container after combining the components in the desired ratio and the catalyst. Alternatively, if a mechanized delivery system is used, vacuum can be applied to each component reservoir, and the components and catalyst can then be combined before further exposure to air or moisture.

To provide for a material exhibiting good impact resistance and ease of removal from the molding surface, the equivalent ratio at step 170 of isocyanate content in the urethane prepolymer product to the amine in the curing agent mixture from step 160 should be in the range of about 0.85 to about 1.1 amine units per isocyanate unit, and more preferably about 0.9 to about 1.0 amine units per isocyanate unit for optimal hardness and impact resistance of the material.

As indicated at step 170, catalysts are used to control the reaction among the Component A and B species. The catalyst is essential to accelerate the reactivity between the hydroxyl groups of the Component B mixture and the pendant isocyanate groups of the Component A formed in step 110, to obtain an optically clear and impact-resistant product. Without the reactive tailoring provided by the catalyst, the amine reaction is favored over the hydroxyl reaction, and an opaque and brittle product is obtained. However, the diamine reaction also is essential to create materials having the requisite high heat stability, high hardness without brittleness, and high impact resistance. The present invention's novel combination of curing agents and catalysts allows for more favorable competition between the kinetically preferred amine reaction and the hydroxyl reaction that is needed to achieve the final optical clarity and balanced strength of the material.

The catalyst used in step 170 of the method of the present invention should be of sufficient purity that it does not introduce unwanted color (especially yellowness) into the mixture. Catalyst concentrations of approximately 10 to 650 ppm are typical. Appropriate catalysts include metal catalysts such as tin, cobalt, and mercury-based catalysts, with tin catalysts preferred, because of their ease of use, safety and proven effectiveness. A single catalyst or a mixture of catalysts may be used. Most preferred among tin catalysts are dibutyltin dilaurate, dibutyltin diacetate, dibutyltin oxide, and dimethyltin carboxylate. Tertiary amines also may be used as added catalysts.

Within the scope of the method of the present invention, the catalyst may be incorporated into the reaction process in a number of ways. As long as moisture and water are excluded, the catalyst may be included in Component A, the Component B mixture, or added when the two Components are combined. If added only when the Components are combined at step 170, care must be taken to ensure thorough mixing for good homogeneity. If included in Component A (for example, along with the additives discussed above for step 120), meticulous exclusion of water is needed to prevent unwanted catalyzed pre-reaction of water with the isocyanate pre-polymer. Preferably, however, the catalyst(s) is included in the Component B mixture, and may be added at step 160 along with the diamine. The Component B mixture remains stable during extended storage, even with the catalyst included, as long as oxygen and moisture are excluded from the mixture.

Various manufacturing techniques may be used to form optical quality parts, including reaction injection molding and casting. One preferred method includes the use of opposed and spaced molding surfaces with a sidefill gasket as described in U.S. Pat. No. 6,391,231 to Evans et al. ("the Evans '231 patent"), incorporated herein by reference. This approach is especially beneficial for even and controlled distribution of the reacting mixture within the mold before its rapid solidification. In addition, using the sidefill gasket may greatly facilitate controlled and reproducible positioning of the reaction material in combination with inserted films, laminates, or other solid inserts or materials to be placed in or on the optical part.

In preferred aspects of the present invention, the mixture of step 170 may begin to harden within about 10 to 50 seconds, similar to previously known optical-quality polyurethane systems. Advantageously, due to the relatively low viscosities of the Components A and B, (respectively, the urethane prepolymer of step 130, and the curing agent mixture from step 160), the combined mixture of the two may flow evenly over a mold surface without requiring additional heating. This allows for manufacturing process freedom to either heat molds for longer flow times, which may be desirable for intricately-shaped optical parts, or to simplify the manufacturing process by eliminating additional heating.

Once Components A and B are combined, the reaction between the urethane prepolymer and curing agent mixture continues, as illustrated in FIG. 1 at step 180, leading to formation of the final optical material. The present invention provides significant process freedom for this curing step. For example, when using Desmodur W diisocyanate prepolymers, mild heat in the temperature range of about 80° C. to about 150° C. can be used to encourage full cure of the material over a period of several hours. Since the material begins to harden within several seconds of combining the materials in step 170, it is possible to either cure the part in the mold, or to remove the part from the mold and subject it to further curing heat and/or time while returning the mold to the manufacturing process. This is another process variable that may be determined by the complexity of the molded shape, the required accuracy of the molding, and other production parameters. As common with most polyurethane chemistries, physical properties continue to improve for a few days after production. Maximum properties generally are attained after 7 to 14 days of room temperature aging.

EXAMPLES

Exemplary optical parts were prepared incorporating the material of the present invention using the method described above. The parts then were tested for optical clarity and for impact resistance. Materials used in these parts, as well as additional exemplary materials, are described in Table 1 below.

TABLE 1

| Ingredient | Description | Supplier |
|---|---|---|
| Tone 32B8 | Caprolactone diol prepared from E-caprolactone and 1,6-hexanediol; molecular weight ~400 | Dow Chemical Co. |
| Tone 32C8 | Caprolactone diol prepared from E-caprolactone and 1,4-butanediol; molecular weight ~750 | Dow Chemical Co. |
| Tone 2221 | Caprolactone diol prepared from E-caprolactone and neopentyl glycol; molecular weight ~1000 | Dow Chemical Co. |
| Tone 1278 | Caprolactone diol prepared from E-caprolactone and 1,4-butanediol; molecular weight ~4000 | Dow Chemical Co. |
| CAPA 2302 | Caprolactone diol prepared from E-caprolactone and 1,4-butanediol; molecular weight ~3000 | Solvay S.A. |
| Desmodur ® W | 4,4'-methylenebis(cyclohexyl isocyanate) containing 20% of the trans,trans isomer and 80% of the cis,cis and cis,trans isomers | Bayer Corp. |
| Ethacure 100LC | 2,4-diamino-3,5-diethyltoluene and 2,6-diamino-3,5-diethyltoluene with color stabilizer | Albemarle Corp. |
| Tinuvin ® 328 | UV stabilizer | Ciba |
| Irganox 1010 | Anti-oxidant | Ciba |
| Lowilite 92 | UV stabilizer | Great Lakes Chemical Co. |
| Exalite 78-13 | Blue dye used a color blocker | Exciton |
| SF 8843 | Surfactant | GE Silicones |
| Fomrez UL-28 | Tin dimethyl tin carboxylate catalyst | Crompton Corp. |
| DABCO 120 | Proprietary Tin catalyst | Air Products and Chemicals, Inc. |

Examples 1 to 5

Preparation of urethane prepolymer (Component A): 13,599.8 grams of Desmodur W were placed in a reactor equipped with an agitator, temperature controller, and a nitrogen gas purge. The system was warmed to a temperature held between 70° C. and 85° C. to avoid thermal shock when the next reactants were added. The agitator then was started, along with the nitrogen purge. 1,316.6 grams of Tone 1278, 607.5 grams of CAPA 2302, and 1841.1 grams of Tone 32B8, all which had been preheated to 82° C., then were added to the reactor. The reaction temperature was allowed to reach 140° C., at which time the heat source was removed. When the temperature of the reactants fell to 120° C., 278.3 grams of Tinuvin 328, 278.3 grams Lowilite 92, 278.3 grams of Irganox 1010, 10 ppm of Exalite 78-13, and 4 ppm of SF-8843 were added to the reactor. When the temperature of the reaction mixture cooled to 71° C., the reaction vessel was evacuated. The reaction product then was transferred into storage containers, re-evacuated, purged with nitrogen and sealed.

Preparation of extended chain polymer: In a large vacuum-compatible container, 5580.8 g of Tone 32B8, 423.8 g of CAPA 2302, and 739.1 g of Desmodur W were combined. This mixture was heated while stirring to a temperature of 140° C. and then allowed to cool to a temperature of 50° C.

Preparation of curing agent mixture (Component B): A nitrogen purge flow was directed into the container of the prepared extended chain polymer. While purging with nitrogen and stirring, 5858.5 g of Ethacure 100LC aromatic diamine, and 2.26 g of Fomrez UL-28, and 1.13 g of DABCO 120 tin catalysts were added to the container. Once the catalysts were blended into the mixture, the nitrogen purge was halted, and the system was evacuated and sealed.

When ready to form the final optical part, the desired ratio of urethane prepolymer (Component A) and the curing agent mixture (Component B) were weighed out and combined in a reaction vessel equipped with an active nitrogen gas purge. The reaction vessel then was quickly degassed in a vacuum bell jar, and the mixture of Components A and B immediately was transferred to the glass molds for the optical part.

To form exemplary parts as described in Examples 1 to 5 below, sets of tempered glass molds were used in which the front molding surface had a concave curve of 6 Diopters (optical power units, referenced to a refractive index of 1.53), and the back molding surface had a convex curve of 6 Diopters. Both molding surfaces were cleaned with isopropanol and air-dried. A sidefill gasket, such as that described in the Evans '231 patent, was used to secure the molding surfaces at a fixed distance from each other, and create a reservoir, which, upon filling the assembled mold with the polyurea/urethane material of the present invention is sufficient to form a 2.2 mm-thick lens having no net optical power. The mold assemblies were heated to 50° C.

To transfer the polyurea/urethane reactive mixture into the forming means (the mold assemblies described above), a pressurized delivery system was used. In these Examples, a SEMCO gun (PRC-DeSoto International, Inc., Phoenix, Ariz.) was equipped with a fill tip to fit snugly into one of the sidefill openings for delivery of the polyurea/urethane material into the assembled mold. The desired ratio of the urethane prepolymer and curing agent mixture were combined and immediately transferred into the SEMCO gun. The temperature of the mixture was approximately 40° C. Nitrogen was used to provide pressure on the gun barrel to direct the material into the mold. Once filled, the mixture was cured in the mold assembly at a temperature of 121° C. for 16.5 hours to form a molded part from the polyurea/urethane material of the present invention.

After curing, to evaluate impact resistance, a modification of the ASTM Z87.1 High Mass Impact Test and its related test apparatus, supplied by ICS Laboratories of Brunswick, Ohio was used. The lens sample was edged to a diameter of 55 mm, mounted in the opening of a steel frame, and secured by two U-shaped arms over the opening. A 500 g weight having a 1 mm radius conical point was dropped onto the molded part from various heights. Any damage observed to the part was recorded. The standard ASTM test requires the part to survive a single impact from 50 inches, without breaking the part into multiple pieces or ejecting any material from its surfaces. In this modified test, if a part showed no damage upon first impact from a given height, further impacts of the same part would be conducted to test residual strength. Additionally, heights greater than 50' were consistently used to subject the parts to even larger forces than those required for the ASTM standards.

Table 2 summarizes the effective ratio of amine to isocyanate for specific combinations of urethane prepolymer (Component A) and curing agent mixture (Component B), and the optical and impact performance of the resulting parts.

TABLE 3

| Example Number | Catalyst content in final product | Optical quality for 1" thick samples | Observations |
|---|---|---|---|
| 6 | none | opaque blue-white | Material is brittle |
| 7 | 43.6 ppm | translucent milky blue | |
| 8 | 131 ppm | transparent | |

These Examples illustrate that the use of catalyst is essential to obtain optimal optical performance of the material created by the method of the present invention.

Examples 9 and 10 below illustrate the optional approach of incorporating additives in both Component A and the Component B mixture, and demonstrate some expanded range of physical properties, while maintaining good optical performance. Additionally, they demonstrate that good physical properties can be achieved using either a narrow molecular weight distribution of polyols, as in Example 9, or more extended ranges, as in Example 10. Example 9 employs a mixture of polyols having molecular weights of only 750 and 1,000. In contrast, the polyols in Example 10 range from 400 to 4,000 in molecular weight.

TABLE 2

| Example number | NCO:NH$_2$ ratio | g Comp. A:g Comp. B | Shore D Hardness | Optical quality | Drop height | Impact Test Result |
|---|---|---|---|---|---|---|
| 1 | 1.0:0.92 | 90.0 g:59.5 g | D84/85 | Transparent | 100" | Multiple fragments |
|   |          |                |        |             | 75"  | PASS 2 impacts |
| 2 | 1.0:0.94 | 90.0 g:60.8 g | D84/85 | Transparent | 100" | Multiple fragments |
|   |          |                |        |             | 75"  | PASS 3 impacts |
| 3 | 1.0:0.96 | 90.0 g:62.1 g | D84/85 | Transparent | 100" | Fewer fragments |
|   |          |                |        |             | 75"  | PASS 5 impacts |
| 4 | 1.0:0.98 | 90.0 g:63.4 g | D84/85 | Transparent | 100" | PASS - no cracks |
| 5 | 1.0:1.0  | 90.0 g:64.7 g | D84/85 | Transparent | 75"  | PASS 5 impacts |

All examples exhibit heat distortion values at 264 psi of 121° C. to 135° C.
PASS = part did not break into fragments, nor was material removed from its surfaces It is clear from these Examples that the materials within the scope of the present invention can produce optical parts having high hardness and impact resistance that easily exceed industry requirements for ophthalmic lenses. In addition, the fact that high optical and mechanical performance can be achieved over a broad range of amine to isocyanate ratios illustrate an important advantage of the present process method: low sensitivity to reactant ratios. Similarly, the hydroxyl concentration can also be varied and obtain good optical and physical properties.

Examples 6 to 8

In Examples 6 to 8 urethane prepolymer and extended chain polymer were prepared as described above in Examples 1 to 5. However, in these Examples, the amount of catalyst added to the curing agent mixture was altered, as shown in Table 3 below, to test the effect of the catalyst on the final product's optical and physical properties. The isocyanate to amine ratio was held constant for each experiment at 1.0:0.94. For these experiments, the mixture of Components A and B was transferred from the reaction vessel into plastic molding cups at room temperature. The mixtures in the molding cups were degassed and then cured at a temperature of 96° C., to form parts approximately 2.75" (70 mm) in diameter and (25 mm) deep. Observations of these parts are provided in Table 3 below.

Example 9

Preparation of urethane prepolymer (Component A): 544.7 grams of Desmodur W were placed in a reactor equipped with an agitator, temperature controller, and a nitrogen gas purge. The system was warmed to a temperature of 70° C. to 85° C. to avoid thermal shock when the next reactants were added, and the agitator then was started, along with the nitrogen purge. 102.7 grams of Tone 2221, and 76.6 grams of Tone 32C8, all which had been preheated to 82° C., then were added to the reactor. The reaction temperature was allowed to reach 140° C., at which time the heat source was removed. When the temperature of the reactants fell to 120° C., 8.7 grams of Tinuvin 328, 8.7 grams Lowilite 92, 8.7 grams of Irganox 1010, 10 ppm of Exalite 78-13, and 4 ppm of SF-8843 were added to the reactor. When the temperature of the reaction mixture cooled to 71° C., the reaction vessel was evacuated. The reaction product then was transferred into storage containers, re-evacuated, purged with nitrogen and sealed.

Preparation of extended chain polymer: In a vacuum-compatible container, 393.3 g of Tone 2221, 293.4 g of Tone 32C8, and 52.1 g of Desmodur W were combined. This mixture was heated while stirring to a temperature of 140° C., and then the heat source was removed. When the temperature of the reactants fell below 120° C., 3.7 grams of Tinuvin 328, 3.7 grams Lowilite 92, 3.7 grams of Irganox 1010, 10 ppm of Exalite 78-13, and 4 ppm of SF-8843 were added to the reactor. The mixture incorporating these additives was allowed to cool to a temperature of 50° C.

Preparation of curing agent mixture (Component B): 47.2 grams of the extended chain polymer and additive mixture were placed in a container equipped with a nitrogen purge and a stirrer. While purging with nitrogen and stirring, 35.5 g of Ethacure 100LC aromatic diamine, and 0.029 g of Fomrez UL-28, and 0.027 g of DABCO 120 tin catalysts were added to the container. Once the catalysts were blended into the mixture, the nitrogen purge was halted, and the system was evacuated and sealed.

Example 10

The same urethane prepolymer was used as described in Example 9.

Preparation of extended chain polymer: In a vacuum-compatible container, 321.4 g of Tone 2221, 239.8 g of Tone 32C8, 24.5 g of Tone 1278, 81.7 g of Tone 32B8, and 56.5 g of Desmodur W were combined. This mixture was heated while stirring to a temperature of 140° C. and then the heat source was removed. When the temperature of the reactants fell below 120° C., 4.3 grams of Tinuvin 328, 4.3 grams Lowilite 92, 4.3 grams of Irganox 1010, 10 ppm of Exalite 78-13, and 4 ppm of SF-8843 were added to the reactor. The mixture incorporating these additives was allowed to cool to a temperature of 50° C.

Preparation of curing agent mixture (Component B): 45.8 grams of the extended chain polymer and additive mixture were placed in a container equipped with a nitrogen purge and a stirrer. While purging with nitrogen and stirring, 36.3 g of Ethacure 100LC aromatic diamine, and 0.029 g of Fomrez UL-28, and 0.027 g of DABCO 120 tin catalysts were added to the container. Once the catalysts were blended into the mixture, the nitrogen purge was halted, and the system was evacuated and sealed.

For both Examples 9 and 10, the desired ratio of Component A to Component B then was weighed out and introduced into mold assemblies using the SEMCO gun as described in Examples 1 to 5. Table 4 details reaction conditions and summarizes the optical and impact performance of the resulting parts, for direct comparison with Table 2.

TABLE 4

| Example number | NCO:NH$_2$ ratio | g Comp. A:g Comp. B | Shore D Hardness | Optical quality | Drop Height | Impact Test Result |
| --- | --- | --- | --- | --- | --- | --- |
| 9 | 1.0:0.95 | 100.0 g:82.7 g | D80 | Transparent | 100" | PASS 2 impacts |
| 10 | 1.0:0.98 | 100.0 g:82.1 g | D82 | Transparent | 100" | PASS 2 impacts |

PASS = part did not break into fragments, nor was material removed from its surfaces.

These results compare favorably with the results of Table 2, showing that significant processing freedom is possible while maintaining optimal performance. Interestingly, Examples 9 and 10 exhibited significantly higher heat distortion temperatures than Examples 1 to 5, again indicating that a good range of physical properties are achievable using the method of the present invention. The product of Example 9 showed a heat distortion temperature of 164° C., while the product Example 10 showed a heat distortion temperature of 155° C. These higher heat distortion temperatures may be useful if the optical part produced is to be subjected to excessive thermal shock or exposure.

Although the invention has been disclosed in detail with reference only to the preferred materials and methods, those skilled in the art will appreciate that additional polyurea/urethane materials and methods for such materials can be performed without departing from the scope of the invention. Accordingly, the invention is identified by the following claims.

We claim:

1. A method for making an optical-quality, impact resistant polyurea/urethane material, comprising:
   reacting a first diisocyanate with a first polyol to form a urethane prepolymer having an equivalent ratio of at least about 3 isocyanate groups per hydroxyl group;
   reacting a second diisocyanate with a second polyol to form a hydroxyl-terminated extended chain polymer having an equivalent ratio of between about 3 and about 8 hydroxyl groups per isocyanate group;
   blending the hydroxyl-terminated extended chain polymer with a diamine to form a curing agent mixture; and
   reacting the urethane prepolymer with the curing agent mixture and a catalyst, wherein the catalyst is configured to promote the reaction of the hydroxyl groups of the curing agent mixture with the isocyanate groups of the urethane prepolymer, to form the polyurea/urethane material.

2. A method as defined in claim 1, wherein the urethane prepolymer has an equivalent ratio of between about 4 and about 16 isocyanate groups per hydroxyl group.

3. A method as defined in claim 2, wherein the urethane prepolymer has an equivalent ratio of between about 8 and about 12 isocyanate groups per hydroxyl group.

4. A method as defined in claim 2, wherein the hydroxyl-terminated extended chain polymer has an equivalent ratio of between about 3 and about 5 hydroxyl groups per isocyanate group.

5. A method as defined in claim 1, wherein the first diisocyanate comprises an aliphatic or cycloaliphatic diisocyanate.

6. A method as defined in claim 5, wherein the aliphatic or cycloaliphatic diisocyanate comprises 4,4'-methylenebis (cyclohexyl isocyanate), 1,3-,1,4-bis(isocyanatomethyl) cyclohexane, isophorone diisocyanate, tetramethylxylene diisocyanate, or mixtures thereof.

7. A method as defined in claim 1, wherein the first polyol comprises a diol having a molecular weight between about 150 and about 4,000.

8. A method as defined in claim 7, wherein the diol comprises polyester diol, polyether diol, caprolactone diol, polycarbonate diol, or mixtures thereof.

9. A method as defined in claim 1, further comprising a step of blending additives into the urethane prepolymer.

10. A method as defined in claim 1, wherein the second diisocyanate comprises an aliphatic or cycloaliphatic diisocyanate.

11. A method as defined in claim 10, wherein the aliphatic or cycloaliphatic diisocyanate comprises 4,4'-methylenebis (cyclohexyl isocyanate), 1,3-,1,4-bis(isocyanatomethyl) cyclohexane, or mixtures thereof.

12. A method as defined in claim 1, wherein the second polyol comprises a diol having a molecular weight between about 90 and about 4,000.

13. A method as defined in claim 12, wherein the second polyol comprises one or more caprolactone diols.

14. A method as defined in claim 1, wherein the diamine comprises aromatic diamine.

15. A method as defined in claim 14, wherein the aromatic diamine comprises diethyltoluene-dianline, 4,4'-methylenebis(3-chloro-2,6-diethylaniline), 4,4'-methylene-bis(2-chloro-aniline), 1,2-bis(2-aminophenylthio) ethane, or mixtures thereof.

16. A method as defined in claim 1, wherein the catalyst is present in an amount between about 10 ppm and about 650 ppm of the combined amount of the urethane prepolymer and the curing agent mixture.

17. A method as defined in claim 1, wherein the step of reacting the urethane prepolymer with the curing agent mixture in the presence of a catalyst comprises blending the catalyst into the curing agent mixture.

18. A method as defined in claim 1, wherein the catalyst comprises metal.

19. A method as defined in claim 18, wherein the metal is tin, cobalt, or mercury.

20. A method as defined in claim 19, wherein the catalyst comprises dibutyl tin dilaurate, dibutyl tin diacetate, dibutyl tin oxide, dimethyl tin carboxylate, or mixtures thereof.

21. A method as defined in claim 1, wherein the steps of reacting a first diisocyanate with a first polyol, reacting a second diisocyanate with a second polyol, and blending the hydroxyl-terminated extended chain polymer with a diamine all are performed while minimizing contact of the first diisocyanate, first polyol, second diisocyanate, second polyol, hydroxyl-terminated extended chain polymer, or diamine with oxygen or water.

22. A method as defined in claim 1, wherein the step of reacting the urethane prepolymer with the curing agent mixture comprises reacting the urethane prepolymer with the curing agent mixture in a ratio ranging between about 0.85 to about 1.1 amine units per isocyanate unit.

23. A method as defined in claim 22, wherein the urethane prepolymer and the curing agent mixture are reacted in a ratio ranging between about 0.90 to about 1.0 amine units per isocyanate unit.

24. A method for making an optical-quality, impact resistant polyurea/urethane material, comprising:

reacting a first diisocyanate with a first polyol to form a urethane prepolymer having an equivalent ratio of at least about 3 isocyanate groups per hydroxyl group;

reacting a second diisocyanate with a second polyol to form a hydroxyl-terminated extended chain polymer having an equivalent ratio of between about 3 and about 8 hydroxyl groups per isocyanate group;

blending the hydroxyl-terminated extended chain polymer with a diamine and a catalyst to form a curing agent mixture, wherein the catalyst is configured to promote the reaction of the hydroxyl groups of the curing agent mixture with the isocyanate groups of the urethane prepolymer; and reacting the urethane prepolymer with the curing agent mixture to form the polyurea/urethane material.

25. A method as defined in claim 24, wherein the urethane prepolymer has an equivalent ratio of between about 4 and about 16 isocyanate groups per hydroxyl group.

26. A method as defined in claim 25, wherein the urethane prepolymer has an equivalent ratio of between about 8 and about 12 isocyanate groups per hydroxyl group.

27. A method as defined in claim 24, wherein the hydroxyl-terminated extended chain polymer has an equivalent ratio of between about 3 and about 5 hydroxyl groups per isocyanate group.

28. A method as defined in claim 24, wherein the first diisocyanate comprises an aliphatic or cycloaliphatic diisocyanate.

29. A method as defined in claim 28, wherein the aliphatic or cycloaliphatic diisocyanate comprises 4,4'-methylenebis(cyclohexyl isocyanate), 1,3-1,4 bis(isocyanatomethyl) cyclohexane, isophorone diisocyanate, tetramethylxylene diisocyanate, or mixtures thereof.

30. A method as defined in claim 24, wherein the first polyol comprises a diol having a molecular weight between about 150 and about 4,000.

31. A method as defined in claim 30, wherein the diol comprises polyester diol, polyether diol, caprolactone diol, polycarbonate diol, or mixtures thereof.

32. A method as defined in claim 24, further comprising a step of blending additives into the urethane prepolymer.

33. A method as defined in claim 24, wherein the second diisocyanate comprises an aliphatic or cycloaliphatic diisocyanate.

34. A method as defined in claim 33, wherein the aliphatic or cycloaliphatic diisocyanate comprises 4,4'-methylenebis(cyclohexyl isocyanate), 1,3-1,4-bis(isocyanatomethyl) cyclohexane, or mixtures thereof.

35. A method as defined in claim 24, wherein the second polyol comprises a diol having a molecular weight between about 90 and about 4,000.

36. A method as defined in claim 35, wherein the second polyol comprises one or more caprolactone diols.

37. A method as defined in claim 24, wherein the diamine comprises aromatic diamine.

38. A method as defined in claim 37, wherein the aromatic diamine comprises diethyltoluene-diamine, 4,4'-methylenebis(3-chloro-2,6-diethylaniline), 4,4-methylene-bis(2-chloro-aniline), 1,2-bis(2-aminophenylthio) ethane, or mixtures thereof.

39. A method as defined in claim 24, wherein the catalyst is present in an amount between about 10 ppm and about 650 ppm of the combined amount of the urethane prepolymer and the curing agent mixture.

40. A method as defined in claim 24, wherein the catalyst comprises metal.

41. A method as defined in claim 40, wherein the metal is tin, cobalt, or mercury.

42. A method as defined in claim 41, wherein the catalyst comprises dibutyl tin dilaurate, dibutyl tin diacetate, dibutyl tin oxide, dimethyl tin carboxylate, or mixtures thereof.

43. A method as defined in claim 24, wherein the steps of reacting a first diisocyanate with a first polyol, reacting a second diisocyanate with a second polyol, and blending the hydroxyl-terminated extended chain polymer with a diamine all are performed while minimizing contact of the first diisocyanate, first polyol, second diisocyanate, second polyol, hydroxyl-terminated extended chain polymer, or diamine with oxygen or water.

44. A method as defined in claim 24, wherein the step of reacting the urethane prepolymer with the curing agent mixture comprises reacting the urethane prepolymer with the curing agent mixture in a ratio ranging between about 0.85 to about 1.1 amine units per isocyanate unit.

45. A method as defined in claim 44, wherein the urethane prepolymer and the curing agent mixture are reacted in a ratio ranging between about 0.90 to about 1.0 amine units per isocyanate unit.

* * * * *